US006409891B1

United States Patent
Lippey et al.

(10) Patent No.: US 6,409,891 B1
(45) Date of Patent: Jun. 25, 2002

(54) LOW ENERGY PLASMA CLEANING METHOD FOR CRYOFILMS

(75) Inventors: Barret Lippey, Gardena; Darrell A. Gleichauf, Redondo Beach; Weldon S. Williamson, Malibu, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/236,780

(22) Filed: Apr. 29, 1994

(51) Int. Cl.$^7$ .............................. C23C 14/34; B08B 7/00
(52) U.S. Cl. ............................ 204/192.36; 204/192.32; 204/192.34; 204/192.35; 134/1; 134/1.1; 134/2; 134/21; 216/58; 216/66
(58) Field of Search .................... 204/192.32, 192.34, 204/192.35, 192.36; 134/1, 2, 21, 1.1; 156/643, 646, 625, 643.1, 646.1, 625.1; 216/58, 66

(56) References Cited

U.S. PATENT DOCUMENTS

| 3,567,927 A | * | 3/1971 | Barrington | .................. 250/282 |
| 4,786,352 A | * | 11/1988 | Benzing | ...................... 156/643 |
| 4,846,425 A | * | 7/1989 | Champetier | .................... 134/1 |
| 4,977,352 A | | 12/1990 | Williamson | ............ 315/111.81 |

OTHER PUBLICATIONS

Cuomo et al. (IBM Tech. Disclosure Bulletin) Substrate Cleaning by Low–Energy Bombardment vol. 10 No. 4 Sep. 1967 pp. 352–353.*
Akishin et al. (Russian Journal of Physical Chemistry "The Atomisation of Polymers by Argon, Helium and Hydrogen Ions with Energies up to 30keV" vol. 37 No. 12 Dec. 1965 pp1637)*

Lippey and Gleichauf, "On Orbit Cleaning of Cryogenic Optical Surfaces", SPIE vol. 1754 Optical System Contamination (1992), pp. 314–323.
Piper et al., "Cross: Contaminant removal off optical surfaces in space", SPIE vol. 777, Optical System Contamination: Effects, Measurement, Control (1987), pp, 320–332.
Proceedings of the SPIE: Stray Radiation V, vol. 675, Aug. 18, 1986, San Diego, CA, US, pp 287–294. Deguchi et al., "Oxygen Ion Cleaning of Organic Contaminants."
Journal of Vacuum Science and Technology: Part A, vol. 6, No. 3, May 1988, New York, US, pp 1300–1301. Hankins et al., "Ion Beam Removal of Contaminants from Mirrors at Cryogenic Temperatures."
Document AD 699 087, US Department of Commerce Clearinghouse for Federal Scientific and Technical Information, Nov. 1969, Hollahan et al., "Restoration of Optical Properties of Surfaces by Radiofrequency Excited Oxyen."
Research and Development, vol. 30, No. 10, Oct. 1988, US, pp 109–114, George, "^974 Mirrors are in Space and You Have to Clean Them."

* cited by examiner

*Primary Examiner*—Rodney G. McDonald
(74) *Attorney, Agent, or Firm*—DiPinto & Shimokaji, P.C.

(57) ABSTRACT

Cryofilm/organic contaminants are removed from cryogenically cooled surfaces such as spacecraft cryo-telescope mirrors by sputtering and chemical reaction with a low energy plasma having an average ion energy of not more than about 30 eV, and preferably in the approximate range of 5–20 eV. When the reactive plasma's freezing point is higher than the temperature of the surface to be cleaned, the cryofilm and embedded hydrocarbons are first removed with a non-reactive plasma having a freezing point less than the surface temperature, the reactive plasma is then used to remove residual organic contaminants left on the surface by chemical reaction, and finally another inert plasma is applied to remove reactive plasma frozen to the surface; the two inert plasmas are preferably formed from the same gas.

7 Claims, 5 Drawing Sheets

LOW ENERGY PLASMA CLEANING METHOD FOR CRYOFILMS

GOVERNMENT RIGHTS

This invention was made with Government support under Contract No. F30602-89-C-0163 awarded by the Department of the Air Force. The Government has certain rights in this invention.

BACKGROUND OF THE INVENTION

1. Field of the Invention

This invention relates to methods of cleaning cryofilms and cryofilm/organic mixtures from cryogenically cooled surfaces, and more particularly to the use of plasma cleaning for removing such contaminants without damaging an underlying optical quality surface.

2. Description of the Related Art

Cryo-telescopes, which are typically used for spacecraft applications, have optical surfaces that are cooled to temperatures in the range of tens Kelvin to make observations in the IR regime. Such devices suffer from a build up of surface contaminants that absorb incident radiation and over time become roughened by sublimation roughening, thereby increasing their optical scatter. The contaminants consist primarily of a mixture of frozen gases such as nitrogen, oxygen, water, ammonia and carbon dioxide that are normally trapped in the materials of the spacecraft, and organic compounds that are outgassed from organic elements in the spacecraft such as adhesives, potting compounds, conformal coatings, bonding agents and thermal blankets. The frozen gases are generally referred to as cryofilms. At temperatures less than approximately 150 K the primary component of contamination is usually a water cryofilm.

In the past, cryo-telescopes have been cleaned by warming them to sublime the cryofilms. However, this process renders the telescope unusable during the time it is being performed, consumes a great deal of cryogen, and allows the residual hydrocarbon contaminants to continue to accumulate.

Another approach to cleaning spacecraft surfaces is described in U.S. Pat. No. 4,846,425 to Champetier and assigned to Hughes Aircraft Company, the assignee of the present invention. This technique uses the negative charge that is typically accumulated on a spacecraft and collects more active electrons than relatively inactive positive ions. Neutral oxygen is released from the spacecraft, ionized by the background space plasma, and drawn back to the spacecraft by its negative charging to react with the surface contaminants. A very large oxygen supply is required, however, because most of the oxygen escapes and is not drawn back to the spacecraft. The patent discloses the reactive ion cleaning of organic contaminants, but not cryofilms. The low energy levels which it uses (about 1–10 eV) would normally be considered too low to produce a sputtering effect capable of removing a cryofilm.

Other attempts to clean space-borne optical devices have employed high energy ion beams. While this technique does result in the removal of contaminants, it has caused unacceptable damage to the delicate optical quality surfaces by ion beam sputtering. The approach is discussed in Lippey and Gleichauf, "On-Orbit Ion Cleaning of Cryogenic Optical Surfaces", *SPIE,* Vol. 1754, 1992, pages 314-323.

Electron cleaning has also been used to remove cryofilm contamination, as described in Pyier et al, "CROSS: contaminant removal off optical surfaces in space", *SPIE,* Vol. 777, 1987, pages 320–332. Unfortunately, electron cleaning has not been found to consistently remove organic materials that may be present along with the cryofilm contamination unless the background level of oxygen gas is high enough (approximately $1\times10^{-5}$ Torr) to result in oxidation rather than polymerization or carbonization. Electron cleaning also heats the surface being cleaned, thus forcing the cleaning rate to be limited by the spacecraft's cryogenic cooling capacity.

SUMMARY OF THE INVENTION

The present invention seeks to provide a method for cleaning cryofilms and cryofilm/organic mixtures from delicate cryogenically cooled surfaces that avoids damage to the underlying surface, allows the device to continue operating during the cleaning process, requires only a moderate supply of the cleaning substance and avoids overheating the delicate surface being cleaned.

The inventors have discovered that, although plasmas with energies low enough to avoid damaging a delicate optical quality surface will not sputter room temperature contaminants, the same low ion energies can be used to sputter off cryofilms in the cryogenic temperature regime. The invention uses plasmas with average ion energies of not more than about 30 eV for this purpose, with the preferred average ion energy in the approximate range of 5–20 eV.

When the plasma is formed from a reactive material such as oxygen that chemically reacts with organic materials imbedded in the cryofilm, complete cleaning of the optical surface can be achieved with a single plasma. Alternately, the cryofilm and a portion of the embedded organic material can be sputtered away with a non-reactive plasma, and any residual organic material remaining on the optical surface removed by chemical reaction with a low energy reactive plasma. The latter approach is particularly useful when the substrate contaminated with the cryofilm is at a lower temperature than the freezing point of the reactive material; a low energy plasma from a non-reactive material such as helium is first used for the sputtering process, followed by a clean up with a reactive plasma such as oxygen. Any residual reactive plasma that is frozen to the substrate can then be removed by sputtering it with a second low energy sputtering plasma, which is preferably the same type of plasma used for the initial sputtering. These treatments may alternate in rapid succession to prevent buildup of a cryofilm of the reactive species. Alternatively, the inert species can contain a small admixture of the reactive species for continuous operation.

These and other features and advantages of the invention will be apparent to those skilled in the art from the following detailed description, taken together with the accompanying drawings.

DETAILED DESCRIPTION OF THE INVENTION

The invention is based upon a recognition that low energy plasmas, which ordinarily would not be capable of sputtering away contaminants from a warm optical surface, can be used effectively for the sputter removal of cryofilms from cryogenically cooled surfaces. The invention is applicable to the cleaning of surfaces at temperatures less than approximately 150 K, below which the primary component of contamination is usually a water cryofilm. The most common temperature range in which the invention would be used is about 30–80 K.

It is not known with certainty why cryofilms can be sputtered with plasma ions at energies significantly less than the sputtering threshold for warm solids. However, it has been theorized by the inventors that the low sputtering threshold for cryofilms stems from a weak bonding between the molecules of the frozen gas. In general, plasma ion energies of about 5 eV are sufficient to initiate sputtering of cryofilms, as opposed to average energies of about 30 eV or more that are necessary to sputter warm solids.

In the preferred embodiment of the invention, a low energy plasma is also used to chemically react with hydrocarbons that are not removed by sputtering, and thereby complete the cleaning of an optical surface to a much higher degree than the cleaning previously achieved by warming the surface to sublimate the cryofilm. Plasmas formed from oxidizing agents such as oxygen, chlorine, fluorine or bromine can be used for this purpose, although oxygen is preferred because it does not condense at low temperatures and does not damage inorganic telescope materials.

An oxygen plasma reacts with the hydrogen and carbon in the organic contaminant to give off carbon monoxide, carbon dioxide, hydrogen and water. One might expect the resultant water to freeze to the cryogenically cooled surface, and thereby at least partially disrupt the cleaning process. In practice, however, frozen water has not been found to accumulate on the cooled surface. It is theorized that if water is formed, the ions have enough kinetic energy to sputter the water from the surface.

Figure 1:
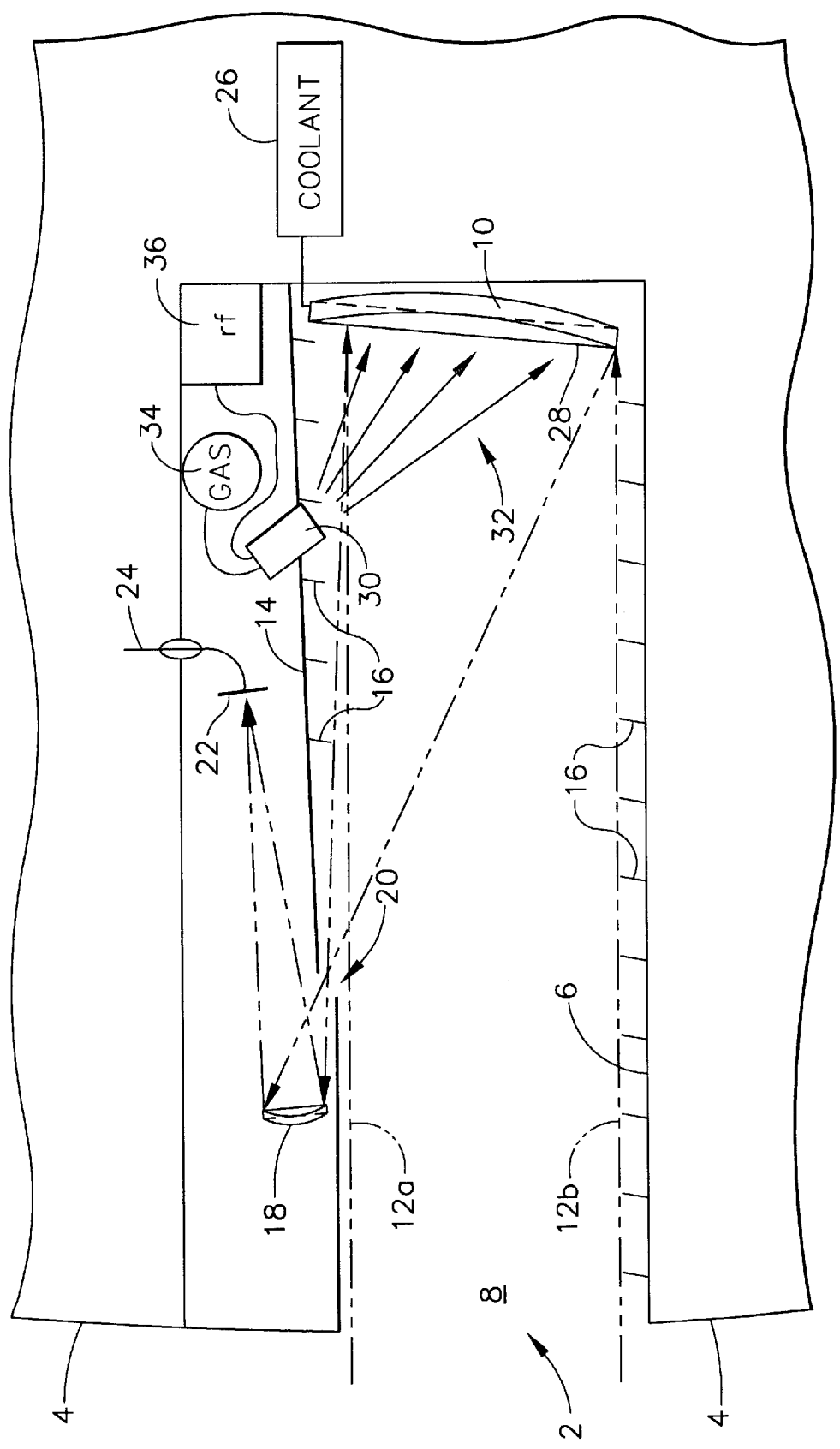
FIG. 1 is a simplified cut-away view of a cryo-telescope being cleaned with a low energy plasma in accordance with the invention.

FIG. 1 is a simplified cut away view of a cryo-telescope 2 being cleaned in accordance with the invention. The telescope would generally be mounted in a spacecraft, the outer skin of which is indicated by reference number 4, with the telescope housed within an enclosure 6 that depends from the spacecraft skin and includes an opening 8 to outer space.

A primary mirror 10 is located at the base of the enclosure, where it is exposed to IR radiation from space; IR rays 12a and 12b are shown incident upon the opposite ends of the mirror. The IR radiation is guided to the mirror through a channel formed by the lower portion of the telescope enclosure 6 and an inner cylindrical wall 14, with baffles 16 provided on the inner channel walls to reduce light scattering.

The primary mirror 10 reflects and converges the incident IR (or other light to be detected) onto a secondary mirror 18 through an opening 20 in the channel. From the secondary mirror 18 the radiation is reflected and focused onto a focal plane array detector 22 or other optical element that provides a digital image output signal along an output line 24 that is fed out through the telescope enclosure.

To permit observations to be made in the IR regime, the primary mirror 10 is cryogenically cooled with a coolant source 26. This causes the mirror's forward surface 28 which receives and reflects the IR radiation from space to be cooled to a low temperature at which cryofilm/organic material mixtures accumulate on its surface. To keep the surface free from such contaminants, a low energy plasma source 30 is positioned in the channel wall 14 so as to direct a low energy plasma 32 onto the mirror's exposed surface 28. The plasma source 30 is supplied with gas from a supply tank 34, and is energized by an rf power source 36. The plasma source 30 produces plasma ions with a low average energy of not more than about 30 eV, and preferably in the approximate range of 5–20 eV. As mentioned above, this has been found to be sufficient to sputter off the cryofilm and reactively remove embedded organic material, without damaging the underlying sensitive optical surface 28.

Figure 2:
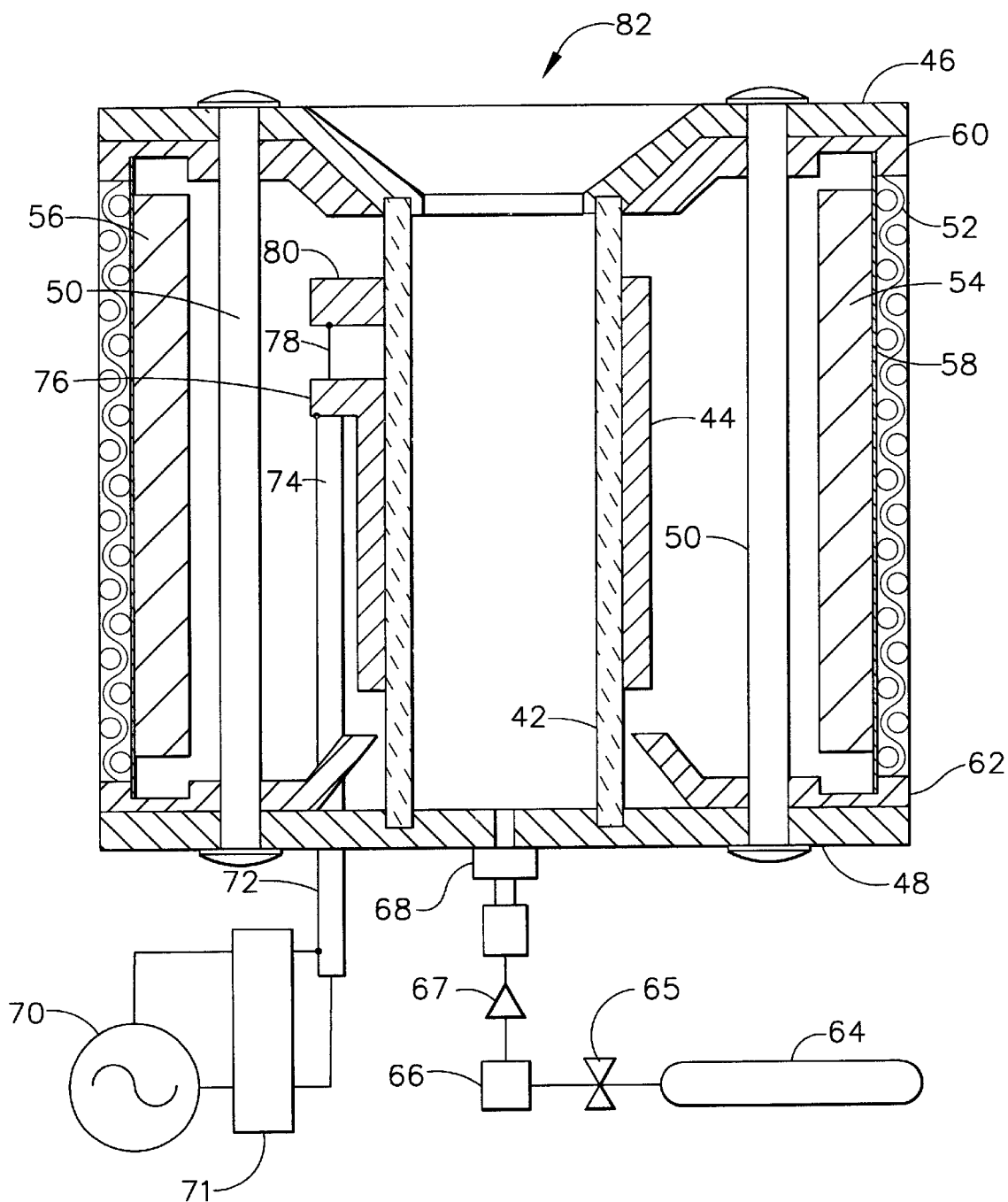
FIG. 2 is a sectional view of a compact rf plasma source that can be used to provide the cleaning plasma.

A preferred embodiment of a compact rf plasma source that can be used to produce the desired low energy plasmas is shown in FIG. 2. It includes a cylindrical plasma tube 42, formed from a material such as alumina, ceramic or glass, within which the plasma is generated. An rf antenna 44 is provided around the exterior of the plasma tube and provides a flow path for rf current that generates an oscillating magnetic field (a magnetic dipole) in a plane perpendicular to the tube's axis. The antenna could at least theoretically be located around the interior of the plasma tube, but that would add to the surface area within the tube and thereby increase the rate of plasma recombination loss. As described below, the antenna has a configuration that avoids the generation of an oscillating field along the tube axis.

The remainder of the assembly is held in place between upper and lower stainless steel endcaps 46 and 48, which are notched to retain the opposite ends of the tube 42. A series of tie bolts 50 are used to secure the endcaps together. An outer wire mesh shield 52 provides additional structural support and protection for the assembly. The antenna 44 is secured against slippage on the plasma tube, such as by a ceramic-to-metal braze.

A number of permanent bar magnets, of which two magnets 54 and 56 are illustrated although typically six-ten magnets would be employed, are provided at various azimuthal positions around a source and housed in a magnet tube 58 that forms a protective housing. The magnets, which can be formed from samarium cobalt or neodymium-iron-boron, establish a magnetic field within the tube that is generally parallel to the tube axis. A cylindrical shell magnet might also be used in place of the bar magnets. The magnetic field is kept generally uniform within the tube through the use of pole pieces 60 and 62 at the upper and lower ends of the assembly. The pole pieces, which are preferably iron or other high permeability magnetic material, are shaped to provide the desired field uniformity; similarly shaped pole pieces are employed in known ion thrusters. The magnet tube 58 is preferably formed from non-magnetic stainless steel to avoid shorting the magnetic circuit.

A plasma source gas is supplied from a gas reservoir 64 through a valve 65, pressure regulator 66, and flow impedance 67 to a fitting 68 on the back end of the plasma tube. Oxygen is commonly used as a source gas because it reacts with hydrocarbon contaminants, but other gases could also be used. In general, any gas or vapor that reacts with organic contaminants would be preferred. Instead of using a valve 65, a heater might be employed to control the gas or vapor flow rate into the plasma tube.

An rf source 70 is coupled to the antenna 44 through an impedance matching network 71, most conveniently via a coaxial cable 72. The cable includes an outer sheath 74 that is connected to one of the antenna electrodes 76, and an inner conductor 78 that extends through electrode 76 and is connected to a second antenna terminal 80.

If desired, the structure shown in FIG. 2 can be modified to add an additional permanent magnet structure, downstream from the magnet structure illustrated in the figure, to provide a more consistent field gradient that encourages outward plasma drift through the tube's open discharge end 82. This type of magnet configuration is used, for example, in the plasma generator of U.S. Pat. No. 4,977,352 to Williamson, one of the present inventors, assigned to Hughes Aircraft Company.

In a typical application of the invention, a 22 mm diameter plasma source is supplied with gas at a flow rate of 0.5–20 sccm (standard (temperature and pressure) cubic centimeters/minute). Higher or lower fluences can be obtained by increasing or decreasing the gas flow rate or power. The input rf power is in the 5–25 W range, while the magnets provide an axial field of about 150 milliTesla (the field is somewhat stronger near the pole faces). With an rf frequency of 100 MHz, a typical oxygen ion current of 50 mA is generated. The energy of the plasma ions and neutrals ranges up to about 30 eV, which is sufficiently below the approximate threshold of 30 eV at which sputter damage to optical surfaces can commence.

Figure 3:
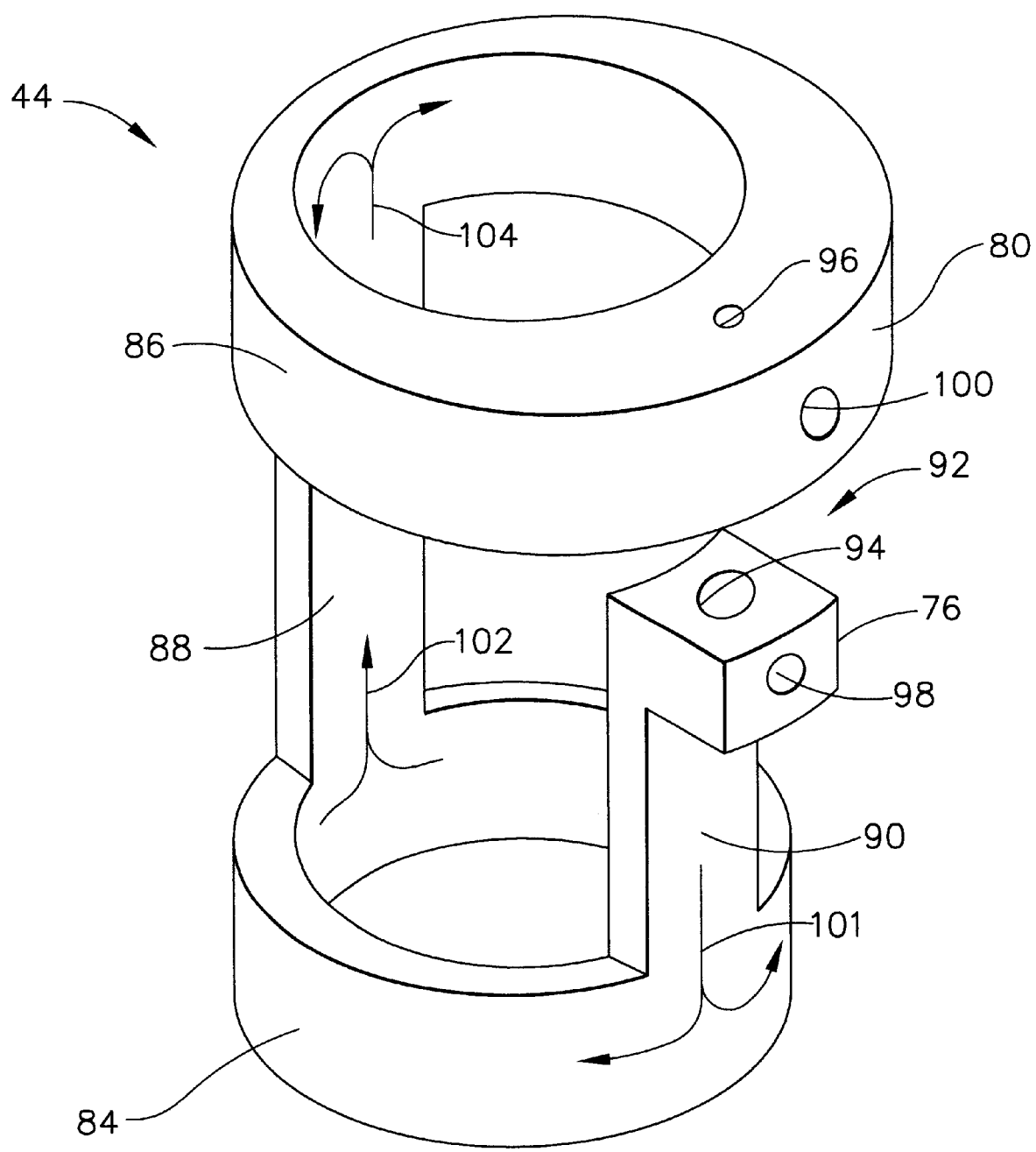
FIG. 3 is a perspective view of an rf antenna used in the plasma source of FIG. 2.

The rf antenna configuration for the compact plasma source in FIG. 2 is detailed in FIG. 3. The antenna 44 is formed from a conductive material such as copper, preferably in a unitary integral construction. The antenna includes a pair of rings 84 and 86 at its opposite ends whose inside diameter is approximately equal to the plasma tube's outer diameter. The two rings are electrically and mechanically connected by a base bar 88, which extends parallel to the common ring/plasma tube axis. The opposite ends of the base bar 88 merge into the rings, and rigidly support them to keep them mutually separated. An rf feeder bar 90 extends between the rings on the diametric opposite side of the antenna from base bar 88. The feeder bar 90 has an interruption 92, allowing the rf signal to be connected across the opposite sides of the interruption. This interruption is preferably between one of the rings 86 and the remainder of the feed bar 90, which extends integrally up from the other ring 84. However, if desired the feed bar can extend in from both rings, with the interruption near its middle.

The terminals 76 and 80 consist of enlarged areas on the opposed ends of the feed bar 90 and upper ring 86. A relatively large axial opening 94 is formed through the feed bar terminal 76 to accommodate the outer sheath of the coaxial cable 72, while a smaller axial opening 96 is formed through the ring terminal 80 to accommodate the cable's inner conductor. Set screw openings 98 and 100 are provided in the terminals perpendicular to the cable openings 94 and 96 so that the cable sheath and inner conductor can be secured in place with set screws. Although the upper ring 86 is illustrated as progressively expanding in width from the base bar 88 to the terminal 80, its width can be held equal to that of the base bar, with a tab on the opposite side of the ring for terminal 80.

The illustrated antenna configuration results in a symmetrical flow of rf current that produces substantially zero net oscillating magnetic field parallel to the tube axis. This is because the antenna provides symmetrical clockwise and counter-clockwise current flow paths around the plasma tube. As illustrated by the arrow 101, the current during one-half of each rf cycle flows from the terminal 76 through the feed bar 90, and divides equally in opposite directions around the lower ring 84. The ring currents recombine at the base bar (arrow 102), and again divide equally in opposite directions around ring 86 at the upper end of the base bar (arrow 104). The upper ring 86 provides a return path to the rf source via terminal 80. This current flow reverses during the other half of the rf cycle, but it still divides symmetrically around the rings and thus avoids the production of a net oscillating magnetic field in the axial direction. Typical dimensions for the antenna are a 28 mm inside diameter, an overall axial length of 57 mm, and a base bar/feed bar thickness of 1 mm.

FIGS. 4a–4d illustrate successive steps of a cleaning process for removing a cryofilm/organic material mixture 106 from the cryo-telescope mirror 10, when the mirror is cooled to a temperature below the freezing point of a reactive plasma-source feed gas. This would be the case, for example, when oxygen is used for the reactive plasma and the mirror is cooled to a temperature below the approximately 32 K freezing point of oxygen in space vacuum.

Figure 4A:
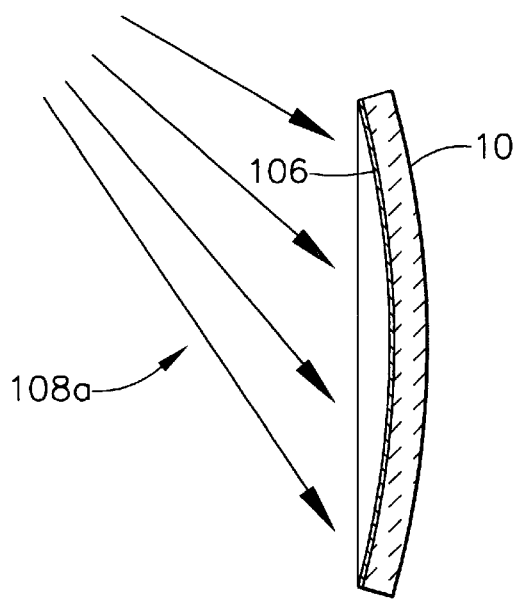
FIGS. 4a–4d illustrate four successive stages in the cleaning process that employs rapidly alternating pulses of reactive and sputtering species for a reactive plasma that freezes at the temperature of the cryo-surface being cleaned.

In the first step, shown in FIG. 4a, a plasma 108a is formed from a substance whose freezing point is less than the mirror temperature. Helium is a preferred gas for this purpose; it is inert and does not react with the organic contaminants, but with an average ion energy of about 5 eV or more the helium plasma sputters off the cryofilm. The average ion energy is restricted to not more than about 30 eV, so as to avoid damaging the underlying mirror surface.

Figure 4B:
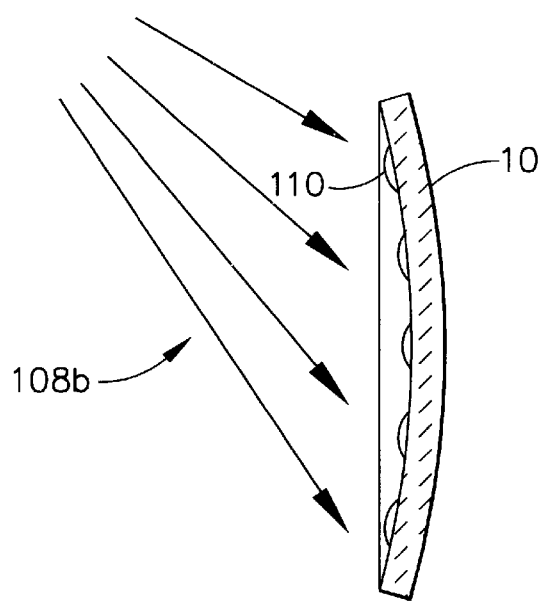
Figure 4C:
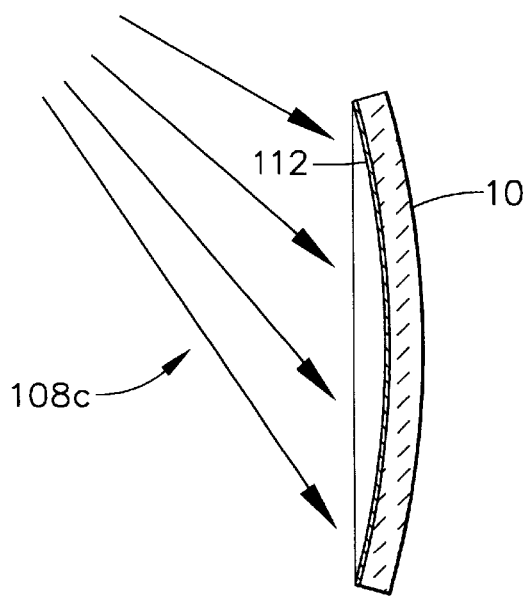

This first cleaning step is effective in removing the cryofilm, but organic contaminant can remain directly at the mirror surface. The removal of this residual organic contaminant 110 is illustrated in FIG. 4b, in which the plasma source is changed to a reactive gas such as oxygen, producing a reactive plasma 108b that chemically reacts with the organic residual 110 to remove it from the mirror.

Figure 4D:
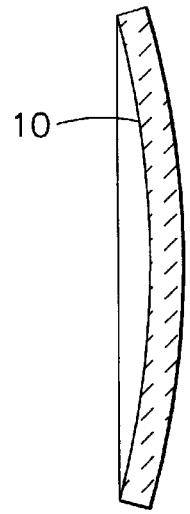

Since the mirror surface is cooler than the freezing point of the gas used for the reactive plasma 108b, some of the reactive plasma-source feed gas will generally freeze to the mirror surface. This is indicated by the frozen film 112 in FIG. 4c. In the third step of the cleaning process, another plasma 108c that is formed from a gas with a freezing point below the mirror temperature is directed onto the mirror surface to sputter off the film 112. The third plasma 108c is preferably formed from the same gas as the first plasma 108a, such as helium. As with the first plasma 108a, the second and third plasmas 108b and 108c are applied with an average ion energy less than 30 eV to avoid damage to the mirror surface. Rapid alternation of the two gases (such as oxygen and helium) will allow cleaning of thick organic films without freezing too much plasma-source feed gas on the surface being cleaned. Alternatively, the inert species can be mixed with a small amount of the reactive species for continuous operation. The final cleaned mirror is illustrated in FIG. 4d, with a reflecting surface that is cleansed of both the cryofilm and the organic contaminant and yet maintains a high optical quality.

Figure 5:
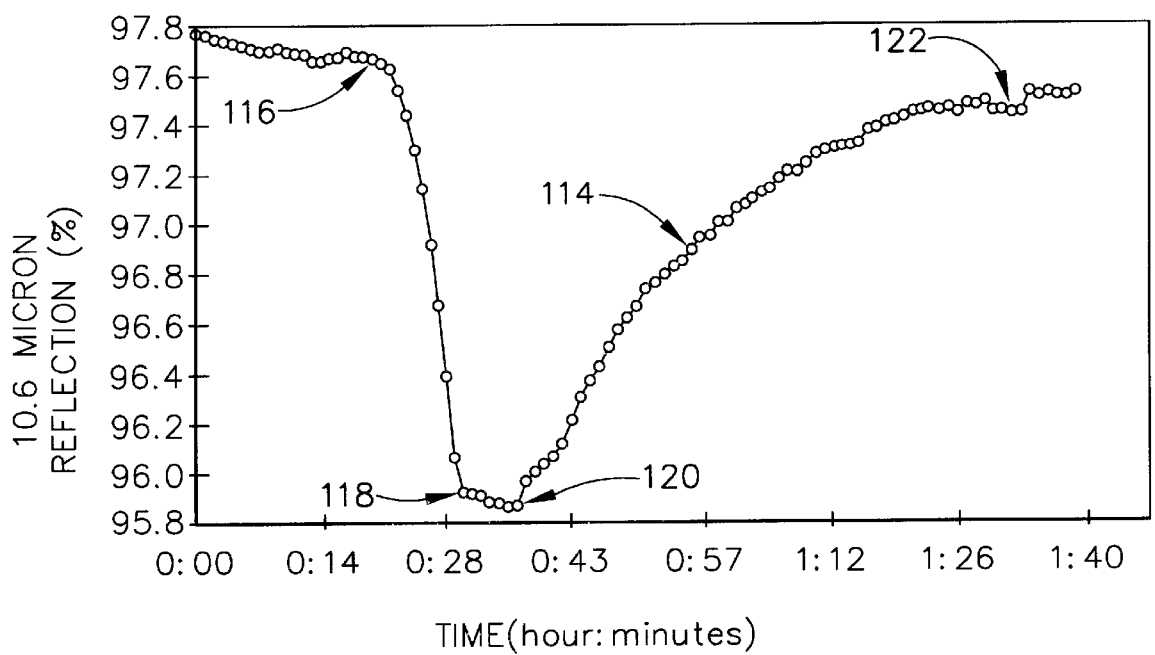
FIG. 5 is graph showing the results of a low energy plasma cleaning of a cryo-surface in accordance with the invention.

FIG. 5 is a graph showing the results of a demonstration of the invention. A 5 cm diameter fused silica mirror coated with overcoated aluminum was maintained at a temperature of 77 K. A cryofilm contaminant was established on the mirror surface from water vapor deposited by a Knudsen cell, the vapor forming a uniform thin film that was invisible to the naked eye. At a monitored wavelength of 10.6 micrometers, however, the film produced a significant reduction in mirror reflection. After approximately one hour of cleaning with an oxygen plasma having an average ion energy of 15 eV, the reflection returned to near pristine condition. This is shown by the graph 114 in FIG. 5, in which the Knudsen cell was turned on and started depositing a water cryofilm at a time 116 (approximately 20 minutes into the demonstration), the cell was turned off and the cryofilm deposition terminated at time 118 (approximately 30 minutes), the plasma source was turned on to initiate cleaning at time 120 (approximately 36 minutes), and the plasma source was turned off to terminate the cleaning at time 122 (approximately 1 hour and 32 minutes).

The 10.6 micrometer reflectance dropped from about 97.7% to about 95.9% while the cryofilm was being deposited, and subsequently rose back up to about 97.5% during the plasma cleaning. The slight reduction in the ending reflectance relative to the starting reflectance was found to be a result of a downward drift of the optical monitor during the demonstration; other experiments confirmed that the low energy plasma cleaning process completely removed the water cryofilm, and that the cleaning effect is not due to simple substrate heating by the plasma.

Other cryogenic contaminants such as ethanol, ethanol/ $H_2O$, DOP (dioctyl phthalate) and DOP/$H_2O$ were removed equally well by the low energy oxygen plasma. The weight, size, power, gas consumption and other properties of the plasma source shown in FIGS. 2 and 3 fit within the limits imposed by spacecraft requirements, and make on-orbit plasma cleaning a very practical solution to the cryogenic contamination problem.

Damage tests of the low energy plasma cleaning technique were performed by exposing a variety of common low scatter mirrors to the low energy plasma at cryogenic temperatures for extended period of time. Mirror substrates such as fused silica, bare beryllium, silicon carbide and aluminum were used. Coatings included protected aluminum and protected gold. Except for the case of electrically grounded conductive substrates with non-conductive over coatings, no damage to the optical mirrors' scatter or reflection was observed. Discharge pits were found in non-conductive coatings applied to electrically grounded substrates, but these can be avoided by electrically insulating the substrate or grounding the plasma to reduce the potential (on the order of a few volts) attained by objects immersed in the plasma.

While particular embodiments of the invention have been shown and described, numerous variation and alternate embodiments will occur to those skilled in the art. Accordingly, it is intended that the invention be limited only in terms of the appended claims.

We claim:

1. A method of removing a cryofilm and organic material mixture from a substrate, comprising:

sputtering said cryofilm and a portion of said organic material off of said substrate with a sputtering plasma having an average ion energy of not more than about 30 eV, and removing the remainder of said organic material from said substrate by reacting it with a reactive plasma having an average ion energy of not more than about 30 eV, wherein said sputtering and reactive plasmas comprise different plasmas.

2. The method of claim 1, wherein said substrate is cryogenically cooled to a temperature below the freezing point of said reactive plasma, said sputtering plasma is formed from a material whose freezing point is less than the substrate temperature, and said reactive plasma is formed from a material whose freezing point is greater than the substrate temperature.

3. The method of claim 2, wherein said sputtering and reactive plasmas are formed from helium and oxygen, respectively.

4. The method of claim 2 wherein, after removing said cryofilm and organic material mixture from said substrate with said sputtering and reactive plasmas, residual reactive plasma frozen to said substrate is removed by sputtering it with a second sputtering plasma that is formed from a material having a freezing point less than said substrate temperature and that has an average ion energy of not more than about 30 eV.

5. The method of claim 4, wherein said sputtering, reactive and second sputtering plasmas are formed from helium, oxygen and helium, respectively.

6. A method of cleaning a cryofilm and organic material mixture from an optical surface of a cryogenically cooled substrate, comprising:

forming a reactive plasma from a material that reacts with said organic material, and directing ions from said reactive plasma towards said substrate surface with an average ion energy in the approximate range of 5–30 eV to sputter said cryofilm and organic material mixture from the optical surface, wherein said substrate is cooled to a temperature below the freezing point of said reactive plasma material, and a preliminary cleaning of said mixture is performed, prior to cleaning with said reactive plasma with a plasma that is formed from a material having a freezing point below the substrate temperature and an average ion energy in the approximate range of 5–30 eV.

7. The method of claim 6, wherein ions from a plasma formed from a material having a freezing point below the substrate temperature are directed towards said substrate surface with an average ion energy in the approximate range of 5–30 eV after cleaning with said reactive plasma to remove residual reactive plasma frozen to said surface.

* * * * *